United States Patent [19]

Bouldin et al.

[11] Patent Number: 4,697,623
[45] Date of Patent: Oct. 6, 1987

[54] APPARATUS FOR CONTINUOUSLY FILLING AND PREPARING POTS FOR RECEIVING PLANTS

[75] Inventors: Floyd E. Bouldin; Lloyd Bouldin; Dwight Bouldin; Jerry W. Pack, all of McMinnville, Tenn.

[73] Assignee: Bouldin & Lawson, Inc., McMinnville, Tenn.

[21] Appl. No.: 899,068

[22] Filed: Aug. 21, 1986

[51] Int. Cl.⁴ .......................... A01G 5/04; B65B 1/00
[52] U.S. Cl. .................................... 141/80; 47/1 A; 141/98
[58] Field of Search ................. 47/1 A; 141/1, 12, 80, 141/98; 175/108; 408/1 R, 32, 33, 34, 35

[56] References Cited

U.S. PATENT DOCUMENTS

| | | | |
|---|---|---|---|
| 1,141,779 | 6/1915 | Daniels | 408/34 |
| 2,826,003 | 3/1958 | Oki et al. | 47/1 A |
| 2,875,650 | 3/1959 | Hazlinger | 408/34 X |
| 4,020,881 | 5/1977 | Nöthen | 141/1 |

Primary Examiner—Stephen Marcus
Assistant Examiner—Mark Thronson
Attorney, Agent, or Firm—Harrington A. Lackey

[57] ABSTRACT

An apparatus for continuously filling and preparing pots for receiving plants including an endless conveyor chain supporting a plurality of pot receiver elements and for continuously carrying pots from a pot loading station through a filling station for filling the pots with potting soil, and through a pot drilling station for drilling holes in the soil for receiving plants and a pot ejector station. The pots are loaded, filled, drilled, and ejected while the pots move continuously through the various stations. The pot drilling mechanism includes a rotary turret supporting a plurality of circumferentially spaced rotating drills which are adapted to reciprocate vertically as they revolve about the rotary axis of the turret, so that each drill will be lowered into a pot for drilling a hole in the soil while moving at the same speed and direction as the pot. Rotary pot loading and ejecting mechanisms are incorporated to move in synchronism with the conveyor chain for loading the pots individually upon the apparatus and for individually ejecting the pots after they are filled and drilled.

19 Claims, 7 Drawing Figures

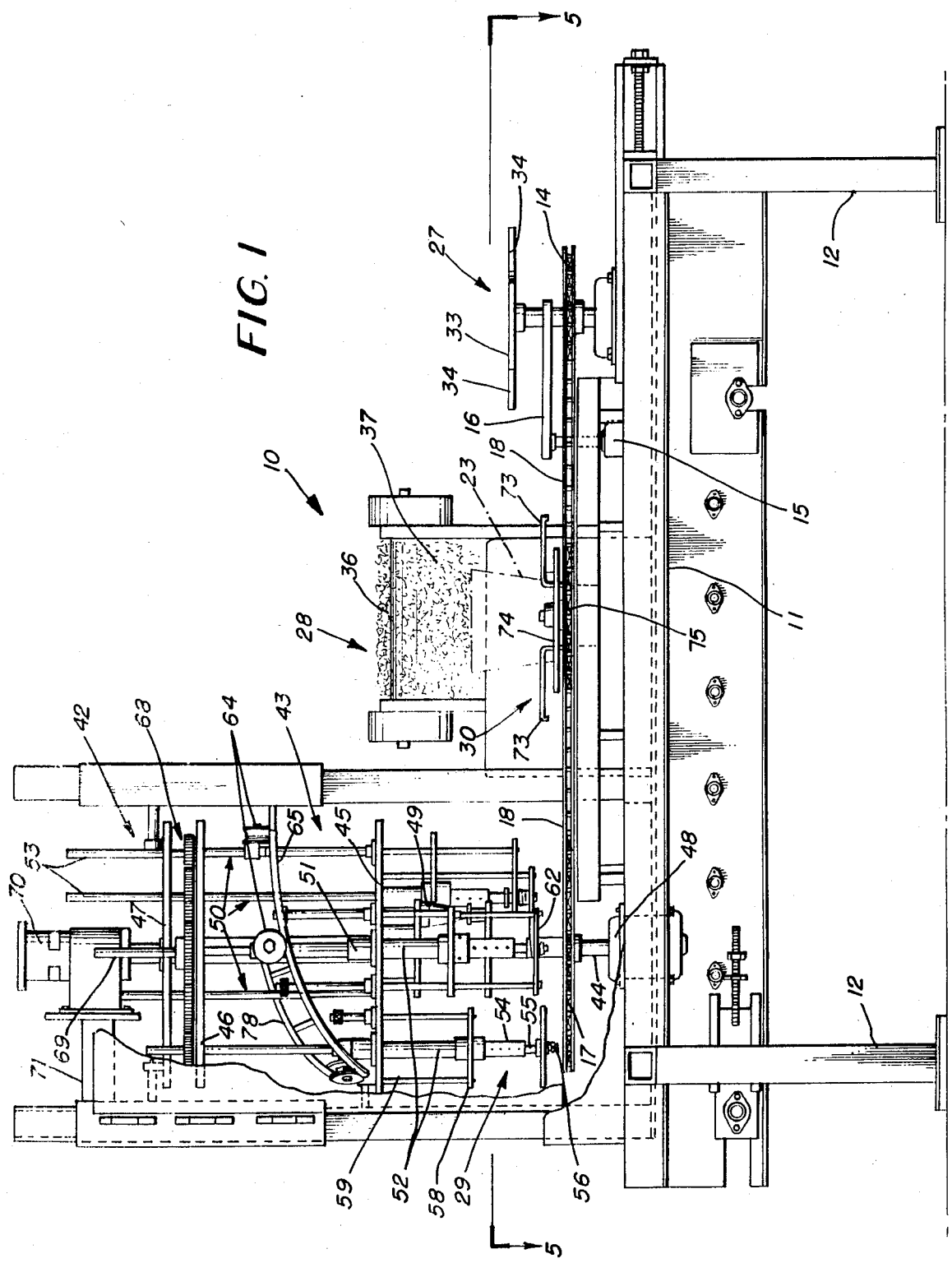

4,697,623

APPARATUS FOR CONTINUOUSLY FILLING AND PREPARING POTS FOR RECEIVING PLANTS

BACKGROUND OF THE INVENTION

This invention relates to a plant pot filling machine, and more particularly to an apparatus for continuously filling and preparing pots for receiving plants.

In the nursery business, plants are potted by initially filling each empty plant pot with a potting soil, then digging or drilling a hole in the center of the potting soil, inserting the trunk or stem of a plant into the hole, and tamping the soil around the plant. The above potting procedure is conducted manually or by machinery for large volume operations.

In a typical pot filling machine, an endless conveyor chain supporting a plurality of spaced pot receptacles or platforms carries the pots sequentially from a loading station to a filling station, a drilling station, and then an ejector station. The pots are loaded either manually or by conveyor. The pots are filled with potting soil from a hopper or conveyor, or manually. A hole is bored in the soil in the pot by a rotary drill, and the filled, drilled pot may be removed manually, or by various types of mechanical ejecting mechanisms. However, for the above described machine operation, the chain drive is indexed to move the pots to the various stations and then stop the motion of the pot until the operation at each station is complete. The total lapsed time for the stopping of the pots for each operation can amount to several hours a day. The lapsed time could be saved if the various potting operations could be carried out continuously.

SUMMARY OF THE INVENTION

It is therefore an object of this invention to provide an apparatus which continuously carries out the steps of loading the pots upon a conveyor, filling the pots with soil, drilling the plant holes in the soil and ejecting the pots, without the necessity of interrupting the movement of the pots.

The apparatus made in accordance with this invention includes an endless conveyor supporting a plurality of spaced pot receivers. The conveyor carries the pots continuously through a loading station, a filling station, a drilling station, and an ejector station.

The pots are loaded upon the continuously moving conveyor preferably by means of a continuously moving pot feeder conveyor and a feeder mechanism which controls the entry of the pots from the feeder conveyor to the corresponding receivers on the continuously moving conveyor chain.

The pots are filled with potting soil by a continuously discharging filling conveyor, so that the discharging potting soil falls in the continuously moving open pots, while the remaining potting soil is collected and recycled to the filling conveyor.

The holes in the potting soil are drilled by a drilling apparatus incorporating a continuously rotating turret member supporting a plurality of circumferentially spaced, vertically reciprocable rotary drills with a cam mechanism for lowering the drills into the registering pots as they move simultaneously in the same direction and at the same speed through the drilling station.

The filled and drilled pots are transversely or laterally ejected by a rotary ejector member or kicker bar which move in synchronism with the moving pot receivers and pots.

BRIEF DESCRIPTION OF THE DRAWINGS

FIG. 1 is a front elevation of the apparatus made in accordance with this invention with some of the parts removed for clarity;

DESCRIPTION OF THE PREFERRED EMBODIMENT

Figure 7:
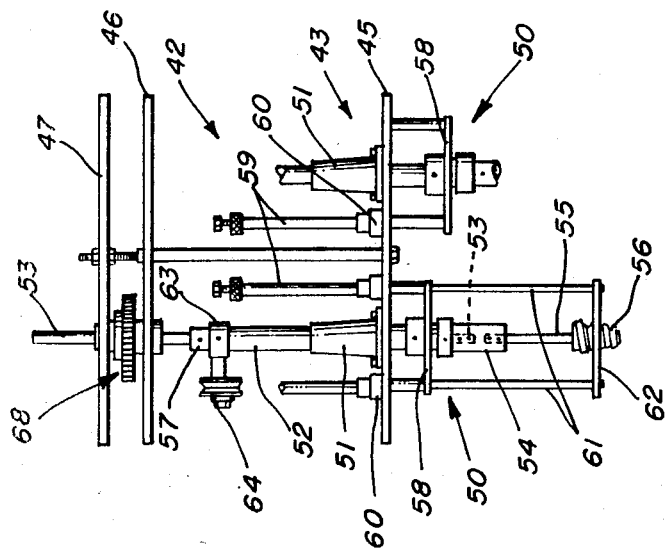
FIG. 7 is an enlarged fragmentary elevation of the turret mechanism, with portions broken away.

Referring now to the drawings in more detail, the apparatus 10 made in accordance with this invention includes an elongated frame 11 supported upon legs 12.

Figure 5:
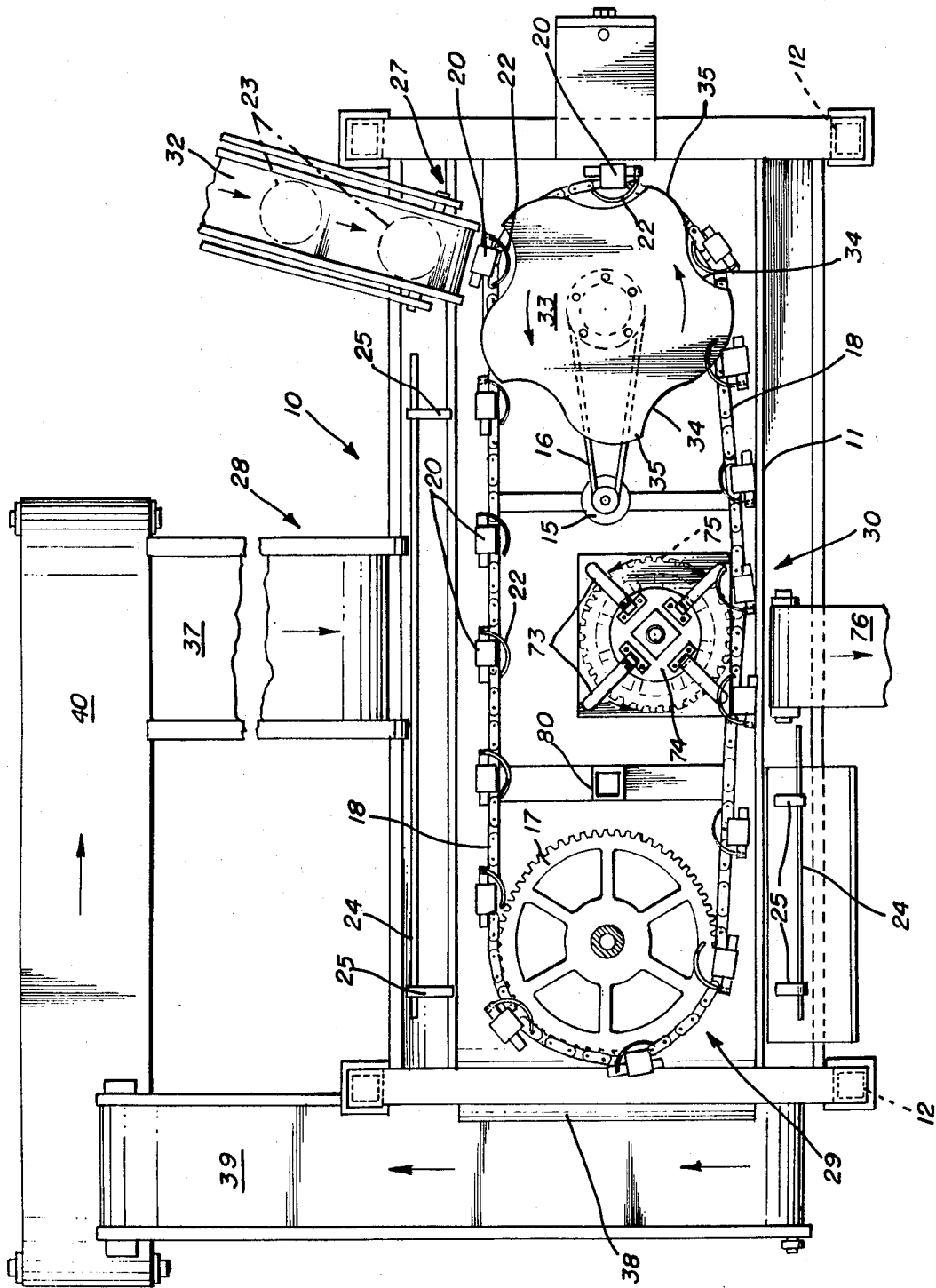
FIG. 5 is a top plan sectional view taken along the line 5—5 of FIG. 1.
Figure 6:
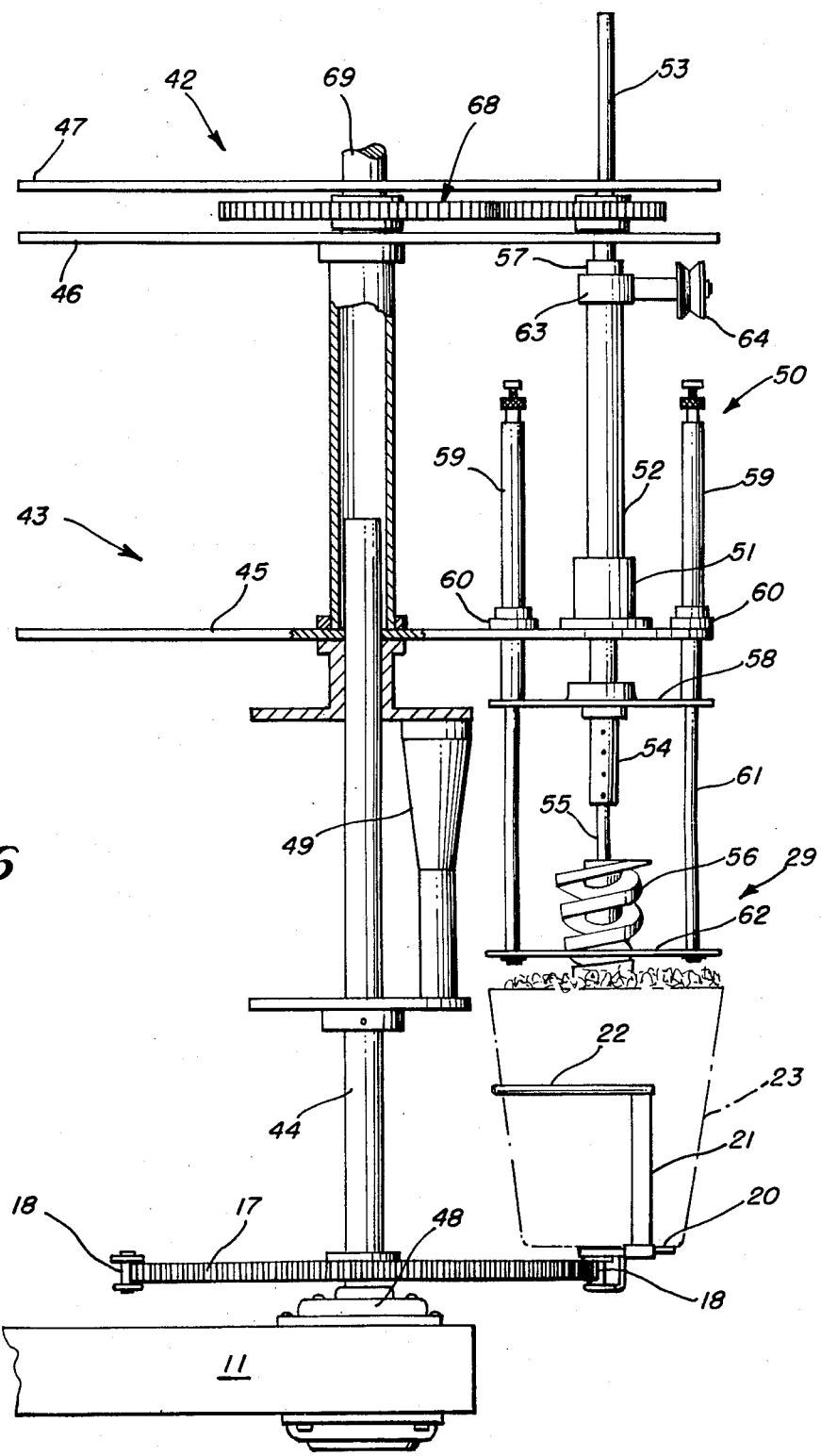
FIG. 6 is an enlarged fragmentary rear elevation of the turret mechanism, with portions broken away, and illustrating the drilling operation upon a single plant pot.

Mounted on the right end portion of the frame 11, as viewed in FIGS. 1 and 5, is a large drive sprocket 14 driven by a drive motor 15 through a transmission 16.

Rotatably supported at the opposite or left end of the frame 11, as viewed in FIGS. 1 and 5, is a large driven or turret sprocket 17. Trained about both the drive sprocket 14 and the turret sprocket 17 is an endless chain 18.

Longitudinally spaced along and fixed to the chain 18 are a plurality of pot receivers or platforms 20. Fixed to each platform 20 is an upright rod or post 21 supporting an elongated arcuate or curved pot retainer element 22. Each of the arcuate retainer elements 22 is located on the inboard side of the chain 18 and is curved to be concave outboard. Thus, a pot 23 may be seated or received upon the platform 20 and restrained against movement inboard of the chain 18, yet is free to be removed outboard of the chain. To prevent the pot 23 from being accidentally removed outboard of the chain 18 through a portion of the chain path, an elongated guide rail 24 (FIG. 5) supported by brackets 25 to the frame 11, adjacent the outboard side of the path of the chain 18.

The chain 18 is adapted to move the pots 23 continuously through a closed path from a loading station 27 through a filling station 28, a drilling station 29, and an ejector station 30.

Although it is possible to manually load pots upon the pot receivers 20 at the loading station 27, nevertheless, in the preferred form of the invention, pots 23 are fed one at a time toward the loading station 27 upon a feed conveyor 32 so that pots 23 are discharged from the feed conveyor 32 directly upon the receiver or platform 20 as it moves past the discharge end of the feed conveyor 32.

Also in a preferred form of the invention, a feed wheel 33 is fixed coaxially upon the shaft of the drive sprocket 14. Formed in the periphery of the feed wheel 33 are a plurality of uniformly spaced arcuate recesses 34, each of which is adapted to register with a pot receiver or platform 20. The lobes 35 extending between adjacent recesses 34 temporarily block the passage of a pot 23 from the discharge end of the feed conveyor 32 until the next succeeding recess 34 is in alignment with the discharge end of the feed conveyor 32, so that the pot from the feed conveyor 32 will be discharged into the registering recess 34, and therefore be assured of being supported upon a platform 20.

The pots 23 received upon the platforms 20 at the loading station 27 are then conveyed to the filling station 28. As the pots 23 move continuously through the filling station 28, potting soil 36 is discharged from the upper discharge end of a filling conveyor 37 and drops downward upon and between the pots 23 in the filling station. Sufficient potting soil 36 is discharged from the filling conveyor 37 to fill the successive pots 23 conveyed through the filling station 28 to the desired levels. The overflow soil dropping between the pots 23 is received upon a return conveyor 38 (FIG. 4) traveling lengthwise of the frame 11 beneath the chain 18. The overflow soil is discharged from one end of the conveyor 38 upon a transverse conveyor 39, which in turn returns the overflow soil through another conveyor 40 to the filling conveyor 37, so that all of the overflow soil 36 is recycled.

The filled pots 23 then move to the drilling station 29, where the pots 23 are carried by the chain 18 around the driven turret sprocket 17.

Supported in the drilling station 29 is a soil drilling apparatus or mechanism 42. The drilling mechanism 42 includes a turret member 43 including a vertical turret shaft 44 upon which are fixed an intermediate drill turret plate 45 and a pair of upper turret gear plates 46 and 47. The bottom end of the turret shaft 44 is journaled in the thrust bearing 48 and is fixed concentrically to the turret sprocket 17. The turret shaft 44 may be made in a pair of telescoping sections, if desired, so that the drill turret plate 45 may be vertically adjusted by the jack 49.

Figure 3:
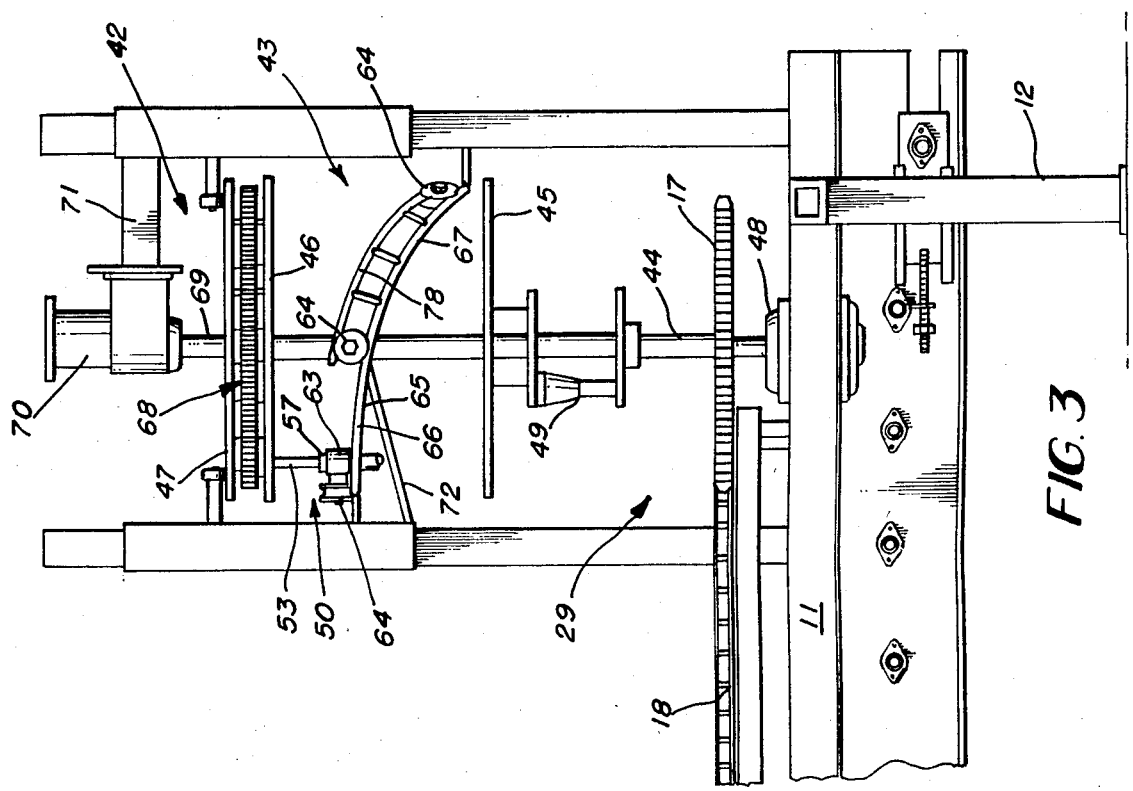
FIG. 3 is a rear elevation of the apparatus disclosed in FIG. 2, with certain portions of the drilling mechanism removed.

The turret plates 45, 46, and 47 support a plurality of drill devices 50 for both rotary and vertically reciprocable movement. Each of the drill devices 50 includes a stationary bearing 51 fixed at circumferentially spaced intervals around and upon the drill turret plate 45, (FIGS. 3 and 7). Adapted to have free vertical, slidable movement within each stationary bearing 51 is a sleeve or column 52, which is restrained against rotary movement relative to the bearing 51 by means of internal splines or other appropriate means, not shown. The sleeve 52 extends through a corresponding opening within the drill turret plate 45. Rotatably received within each sleeve 52 is an upper drill rod or shaft 53, which extends upward through corresponding, vertically aligned holes and bearings within the upper turret plates 46 and 47. The upper drill rod 53 also extends downward below the sleeve 52 and the drill turret plate 45. The lower end of the upper drill rod 53 is connected through a coupler 54 to a lower drill rod or shaft 55, the lower end of which terminates in a drill bit 56.

A collar 57 is fixed to the upper drill rod 53 to prevent the upper drill rod 55 from moving vertically relative to the sleeve 52, but the collar 57 is free to rotate upon the upper end of the sleeve 52.

Fixed to the bottom end of the sleeve 52 is a mounting plate 58. Guide rods 59 fixed to the upper surface of the mounting plate 58 extend through sleeve bearings 60 in the drill turret plate 45. Depending from the mounting plate 58 are a pair of support rods 61 to the lower end of which are secured a packing plate 62. The packing plate 62 has a hole in the center thereof to permit the passage of the drill bit 56. It will be noted in the drawings that the drill bit 56 projects a predetermined depth below the packing plate 62. Thus, when the drill bit 56 is lowered to drill a hole in the soil 36 within a pot 23, the packing plate 62 will contact and depress the soil within the pot 23.

Fixed to a collar 63 at the top of each sleeve 52 is a cam roller 64. The cam rollers 64 are adapted to travel over a contoured cam rail 65 (FIGS. 2 and 3) which is fixed to the frame 11 and extends circumferentially entirely around the drill devices 50. The cam rail 65 is contoured to form an upper or elevated rail portion 66 and a declining lower portion 67. Thus, as the turret member 43 is driven by the turret sprocket 17 to rotate about the rotary axis of the turret shaft 44, the cam rollers 64 riding over the cam rail 65 cause the drill rods 53 and drill bits 56 to rise and fall consistent with the contour of the cam rail 65. The cam rail 65 is contoured to cause the drill bits 56 to descend as the pots 23 enter the drilling station 29 until the drill bits 56 penetrate the top soil in the corresponding vertically aligned pot 23. After a plant hole is drilled into the center of the soil 36 within the corresponding pot 23 to the desired depth, the drill bit 56 is raised by virtue of the cam roller 64 rising on the inclined portion 67 of the cam rail 65.

Each of the drill rods 53 are continually rotated through a planetary gear train 68 mounted between the upper turret plates 46 and 47. The sun gear, not shown, forming the central gear in the planetary gear train 68, is fixed to the drive shaft 69 of the drill motor 70 fixed to the motor bracket 71, which in turn is fixed to a portion of the frame 11.

The contoured cam rail 65 may be fixed to the frame 11 by the support arm 72.

The conveyor chain 18 then carries the pots 23 which have been filled and drilled with corresponding plant holes from the drilling station 29 back toward the loading station 27 at the opposite end of the frame 11. As the filled pots 23 pass the ejector station 30, each pot is ejected or thrust by a rotary ejector member or kick bar 73, a plurality of which are mounted upon a rotary ejector plate 74, (FIGS. 1 and 5). The rotary ejector plate 74 is fixed upon a sprocket 75, which is engaged by the endless chain 18 to drive the ejector members 73 in synchronism with the movement of the pot receivers 20.

Preferably, one or more unloading conveyors 76 are mounted at the ejector station 30 so that the ejected pots may be transferred away from the apparatus 10 to a station, not shown, where the plants are introduced into the filled pots.

In order to exert positive downward pressure upon the cam rollers 64 and drill shafts 55, a top guide rail 78 is supported vertically spaced uniformly above the declining contoured rail portion 67 to engage the top surfaces of the descending cam rollers 64, (FIG. 3).

Figure 2:
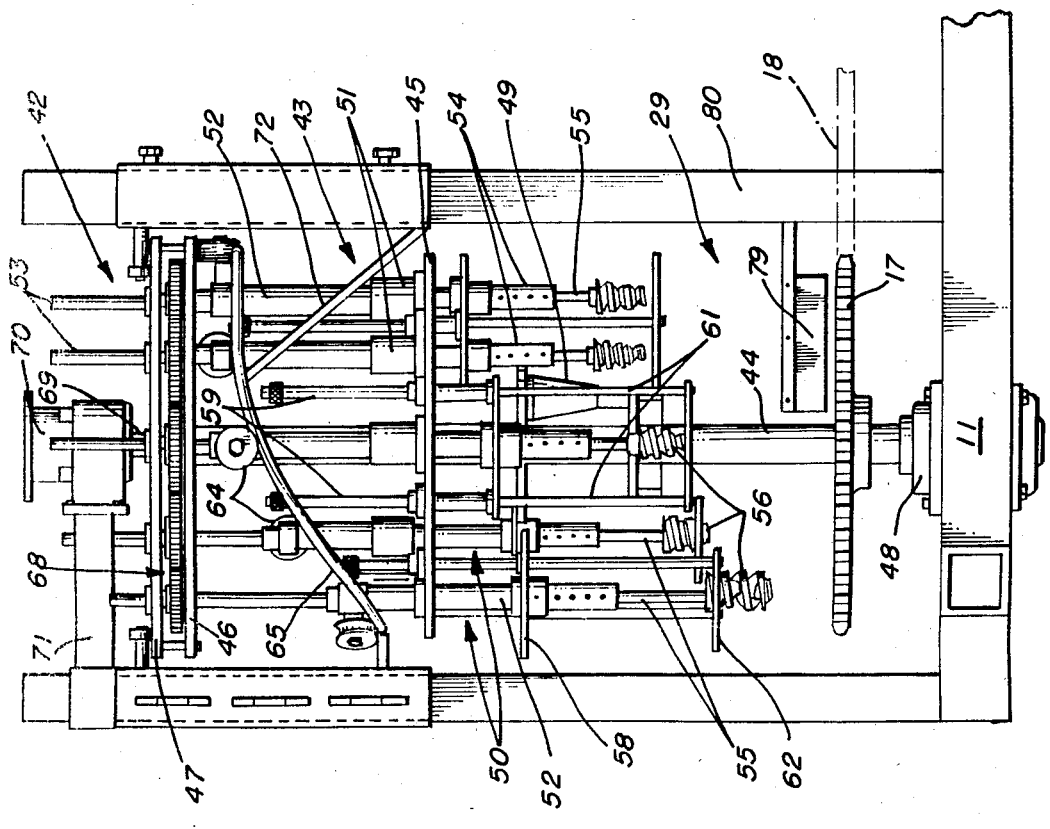
FIG. 2 is an enlarged front elevation of the drilling mechanism forming a part of the apparatus disclosed in FIG. 1.
Figure 4:
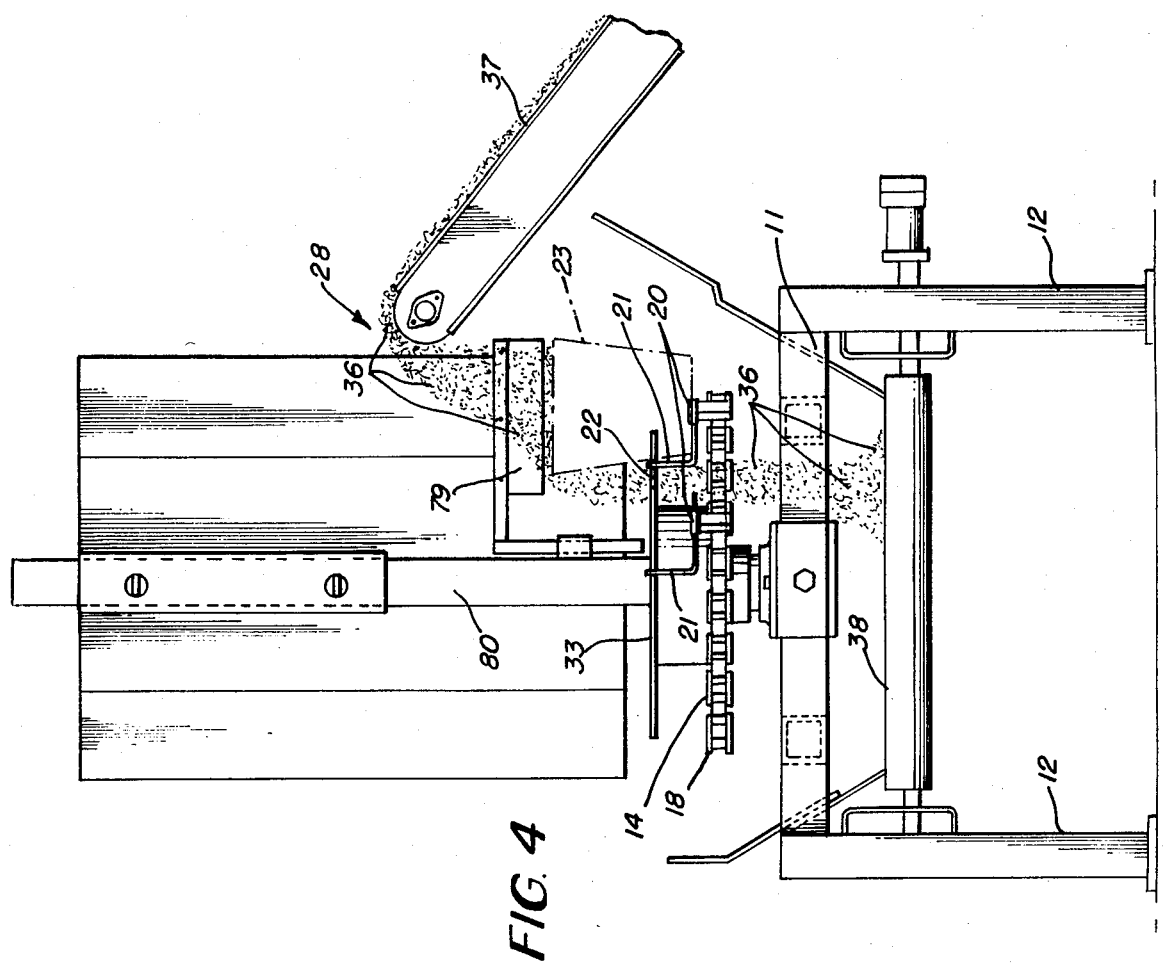
FIG. 4 is an end elevation of the apparatus disclosed in FIG. 2, with certain portions removed.

A wiper 79 fixed to an upright post 80 of the frame 11 extends across the top surface of the rotating turret sprocket 17 for clearing the turret sprocket 17 of spilled potting soil 36, as illustrated in FIGS. 2 and 4.

The operation of the apparatus 10 is evident from the above description. Empty pots 23 are fed one at a time by the feed conveyor 32 to the loading station 27 where the pots 23 are discharged in registry with the recesses 34 in the feed wheel 33. When the pots 23 come to rest upon the platforms 22, the conveyor chain 18 carries the empty pots to the filling station 28 where the pots are filled to the desired level with potting soil 36 from the filling conveyor 37. The filled pots are then transferred without interruption through the drilling station 29 where the continuously rotating and vertically reciprocating drill bits 56 descend into registry with the pots 23 and drill corresponding plant holes in the soil 36. The filled pots into which the plant holes have been formed are then transferred continuously from the drilling station 29 to the ejector station 30 where the pots, again, without interruption, are ejected or discharged upon the unloading conveyor 76.

Thus, an apparatus 10 has been developed which will perform all of the loading, filling, drilling, and unloading functions of prior known potting machines, but without any stopping or interruption of either the conveying or the loading, unloading, filling, or drilling functions. Accordingly, a potting apparatus 10 has been developed which is substantially more efficient than prior known potting machines and which can fill pots and drill the plant holes in the potting soil within the pots in substantially less time, and therefore increase the production of the preparation of potted plants.

What is claimed is:

1. Apparatus for continuously filling and preparing pots for receiving plants, comprising:
   (a) an endless conveyor,
   (b) pot receiving means on said endless conveyor for carrying said pots,
   (c) conveyor drive means for continuously moving said conveyor, to move said pot receiving means in an endless path,
   (d) a loading station in said path in which a plant pot is deposited in said pot receiving means,
   (e) a pot filling station adjacent said path downstream of said loading station and in which potting soil is received in a pot carried by said pot receiving means,
   (f) a pot drilling station in said path downstream of said loading station,
   (g) pot drilling means in said drilling station comprising a rotary turret and a plurality of rotary drills mounted on said turret, said turret having a vertical axis,
   (h) means mounting said turret for rotary movement about said vertical axis,
   (i) means mounting said drills for rotary and vertical axial movement on said turret means at uniform radial distances from said turret axis,
   (j) drill drive means for rotating said drills,
   (k) turret drive means for rotating said turret in synchronism with said conveyor drive means, so that a pot moving in said path through said drilling station is in continuous vertical alignment with one of said drills, and
   (l) means vertically moving said drills as they revolve about said turret axis between a raised position in which said drill is spaced above a corresponding aligned pot and a lower position in which said drill penetrates the potting soil within said vertically aligned pot to drill a hole therein.

2. The invention according to claim 1 further comprising ejector means in said path downstream of said pot drilling station, in which said pots filled with potting soil in which a hole has been drilled, are removed from said pot receiving means.

3. The invention according to claim 1 further comprising a frame, said turret comprising a rotary turret shaft mounted for rotation about said turret axis, said endless conveyor being operatively connected to said turret shaft for simultaneous rotary movement therewith.

4. The invention according to claim 3 in which said turret drive means comprises a turret driven sprocket fixed coaxially to said turret shaft, said endless conveyor comprising an endless conveyor chain trained around said turret driven sprocket.

5. The invention according to claim 4 in which said conveyor drive means comprises a conveyor drive motor mounted on said frame, a drive sprocket about which said conveyor chain is trained, said drive motor driving said drive sprocket.

6. The invention according to claim 5 further comprising an ejector station downstream of said drilling station in said path, a rotary ejector member in said ejector station, said ejector member having a vertical axis means mounting said ejector member for rotary movement about the vertical axis so that said ejector member may be rotated to engage and thrust laterally from said path a pot from said receiving means, and rotary ejector drive means operatively connecting said endless chain and said rotary ejector member for synchronous movement of said ejector member and said chain.

7. The invention according to claim 6 in which said means mounting said ejector member comprises a vertical rotary ejector shaft, said ejector drive means comprising an ejector sprocket fixed to said ejector shaft, said conveyor chain being trained about said ejector sprocket.

8. The invention according to claim 7 in which said ejector member comprises a plurality of ejector fingers circumferentially spaced about said ejector shaft and projecting radially from said ejector shaft for rotation into the path of said pot receiving means.

9. The invention according to claim 7 further comprising unloading conveyor means mounted adjacent said ejector station for receiving filled pots ejected from said pot receiving means by said ejector member.

10. The invention according to claim 5 in which said pot receiving means comprises a plurality of pot supporting platforms spaced along said conveyor chain, a pot retainer member fixed to each said platform comprising a pot retainer element on the inboard side of said conveyor chain to prevent the inboard movement of a pot received on said platform.

11. The invention according to claim 10 further comprising a feeder member mounted for rotation with said drive sprocket, said feeder member having circumferentially spaced recesses, each recess being aligned with a corresponding platform and pot retainer element, a pot feed conveyor for feeding pots one at a time to said pot receiving means, means for the discharge of pots from said pot feed conveyor said discharge means being controlled by said feeder member so that each pot is received on a corresponding platform and within a corresponding recess.

12. The invention according to claim 1 further comprising a filler conveyor located at said pot filling station, said filler conveyor being adapted to convey potting soil to said filling station for deposit of the filling soil from the filling conveyor into pots carried by said pot receiving means.

13. The invention according to claim 6 in which said pot receiving means comprises an open arcuate pot retainer element and means supporting said pot retainer element on said conveyor chain, so that said arcuate retainer element is inboard of said chain and opening outboard to receive a pot in said pot receiving means, said ejector member being adapted to intersect said pot receiving means and rotate beneath said pot retainer element for ejecting said pot away from said pot retainer element.

14. The invention according to claim 4 further comprising a packing plate member for each drill, means mounting said packing plate member on said turret means for vertical reciprocable movement with said drill, said drill having a drill bit projecting through said packing plate member, whereby when said drill descends into the potting soil carried by a corresponding pot, said packing plate member will press against the top surface of the soil in the pot.

15. The invention according to claim 4 in which said drill comprises an elongated drill rod having a drill bit on the lower end thereof, said means mounting said drill for rotary and vertical axial movement comprising a stationary rotary bearing for each drill on said turret means, a sleeve for each drill vertically reciprocable within said stationary bearing, said drill shaft extending through said sleeve and means supporting said drill shaft in said sleeve for free vertical reciprocal, but non-rotary movement.

16. The invention according to claim 15 in which said turret comprises a turret plate fixed coaxially to said turret shaft, said stationary bearings being fixedly supported upon said turret plate.

17. The invention according to claim 15 in which said drill drive means comprises a drill motor, having a drill drive shaft, a planetary gear train mounted on said turret, said gear train coupling said drill drive shaft to said corresponding drill, shafts for rotation of said drill drive shafts while they revolve about the rotary axis of said turret.

18. The invention according to claim 15 in which said means for vertically moving said drills comprises a cam rail fixed to said frame and extending circumferentially around said turret, said cam rail being contoured vertically to occupy different elevations, a cam roller mounted upon said sleeve of each corresponding drill, said cam rollers riding on said cam rail to raise and lower said corresponding drills as they revolve about the rotary axis of said turret shaft.

19. The invention according to claim 18 further comprising a top guide rail spaced in vertical alignment above the lower portions of said cam rail, a distance substantially equal to the diameter of said cam rollers to force said cam rollers down as said cam rollers move over the lower portions of said cam rail.

* * * * *